United States Patent
Huang

(10) Patent No.: US 9,652,065 B2
(45) Date of Patent: May 16, 2017

(54) TOUCH PANEL AND METHOD FOR MANUFACTURING TOUCH PANEL

(71) Applicants: INTERFACE OPTOELECTRONIC (SHENZHEN) CO., LTD., Shenzhen (CN); GENERAL INTERFACE SOLUTION LIMITED, Miaoli County (TW)

(72) Inventor: Kung-Chieh Huang, Hsinchu (TW)

(73) Assignees: INTERFACE OPTOELECTRONIC (SHENZHEN) CO., LTD., Shenzhen (CN); GENERAL INTERFACE SOLUTION LIMITED, Miaoli County (TW)

( * ) Notice: Subject to any disclaimer, the term of this patent is extended or adjusted under 35 U.S.C. 154(b) by 146 days.

(21) Appl. No.: 14/555,698

(22) Filed: Nov. 28, 2014

(65) Prior Publication Data

US 2016/0004365 A1    Jan. 7, 2016

(30) Foreign Application Priority Data

Jul. 4, 2014    (CN) .......................... 2014 1 0316116

(51) Int. Cl.
*G06F 3/041*    (2006.01)
*G06F 3/044*    (2006.01)

(52) U.S. Cl.
CPC ............ *G06F 3/0412* (2013.01); *G06F 3/044* (2013.01); *G06F 2203/04103* (2013.01); *G06F 2203/04112* (2013.01)

(58) Field of Classification Search
CPC ................... G06F 3/0412; G06F 3/044; G06F 2203/04112; G06F 2203/04103
See application file for complete search history.

(56) References Cited

U.S. PATENT DOCUMENTS

| 9,141,248 B2* | 9/2015 | Kim ........................ G06F 3/045 |
| 2011/0291966 A1* | 12/2011 | Takao ..................... G06F 3/044 345/173 |
| 2011/0310037 A1* | 12/2011 | Moran .................. G06F 3/0412 345/173 |
| 2012/0127122 A1* | 5/2012 | Lim ....................... G06F 3/0416 345/174 |
| 2014/0118641 A1* | 5/2014 | Ryu ....................... G06F 1/1692 349/12 |
| 2015/0370375 A1* | 12/2015 | Hayashi ................. G06F 3/044 345/174 |

\* cited by examiner

*Primary Examiner* — Kwang-Su Yang
(74) *Attorney, Agent, or Firm* — Steven Reiss

(57) ABSTRACT

A touch panel includes a first substrate, a first electrode formed on the first substrate, a second substrate, and a second electrode formed on the second substrate. The first electrode includes a number of first conductive patterns extending in a first direction. The second electrode includes a number of second conductive patterns extending in a second direction. Both the first conductive patterns and the second conductive patterns include a number of parallel first metal wires and a number of parallel second metal wires perpendicularly crossing with the first metal wires. A first angle is defined between the first metal wires of the first conductive pattern and the first direction. A second angle is defined between the first metal wires of the second conductive pattern and the second direction. The first angle is different from the second angle.

7 Claims, 12 Drawing Sheets

TOUCH PANEL AND METHOD FOR MANUFACTURING TOUCH PANEL

FIELD

The disclosure generally relates to touch panel technologies.

BACKGROUND

A touch panel usually employs two metal mesh layers correspondingly as an upper touch sensor and a lower touch sensor to sense a touch position on the touch panel. The metal mesh layer includes a number of first metal wires extending in a first direction and a number of second metal wires extending in a second direction. The first metal wires cross with the second metal wires to form a number of meshes. However, the first metal wires of the upper metal mesh layer are usually parallel to the first metal wires of the lower metal mesh layer. Light passing through the upper metal mesh layer and the lower metal mesh layer generates an interference moire, which adversely affects a display performance of a touch display device with the touch panel.

BRIEF DESCRIPTION OF THE DRAWINGS

Implementations of the present technology will now be described, by way of example only, with reference to the attached figures, wherein.

DETAILED DESCRIPTION

Figure 1:
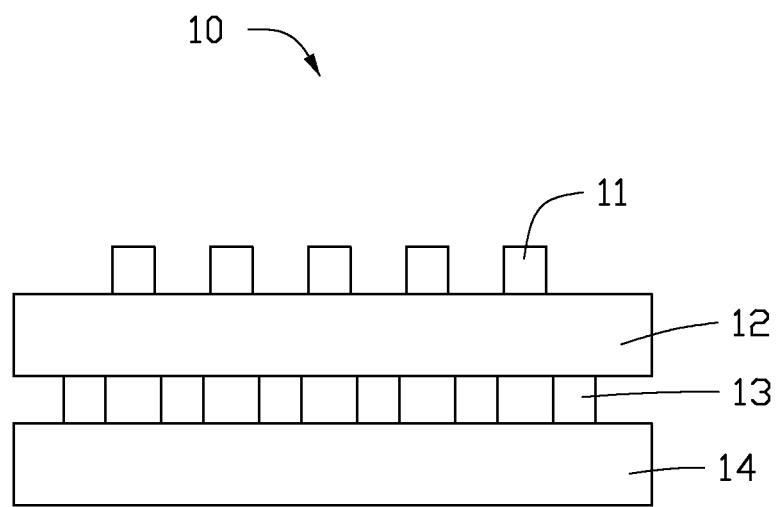
FIG. 1 is an isometric view of an embodiment of a touch panel.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

The following disclosure is described in relation to a touch panel.

FIG. 1 illustrates an isometric view of an embodiment of a touch panel 10. In this embodiment, the touch panel 10 is a capacitive touch panel and includes a first substrate 14, a first electrode 13 formed on the first substrate 14, a second substrate 12 set above the first electrode 13, and a second electrode 11 formed on the second substrate 12. The first substrate 14 and the second substrate 12 are made of transparent material, for example, plastics or glass. In this embodiment, the first substrate 14 is a glass substrate. The second substrate 12 is made of polyethylene terephthalate (PET).

Figure 2:
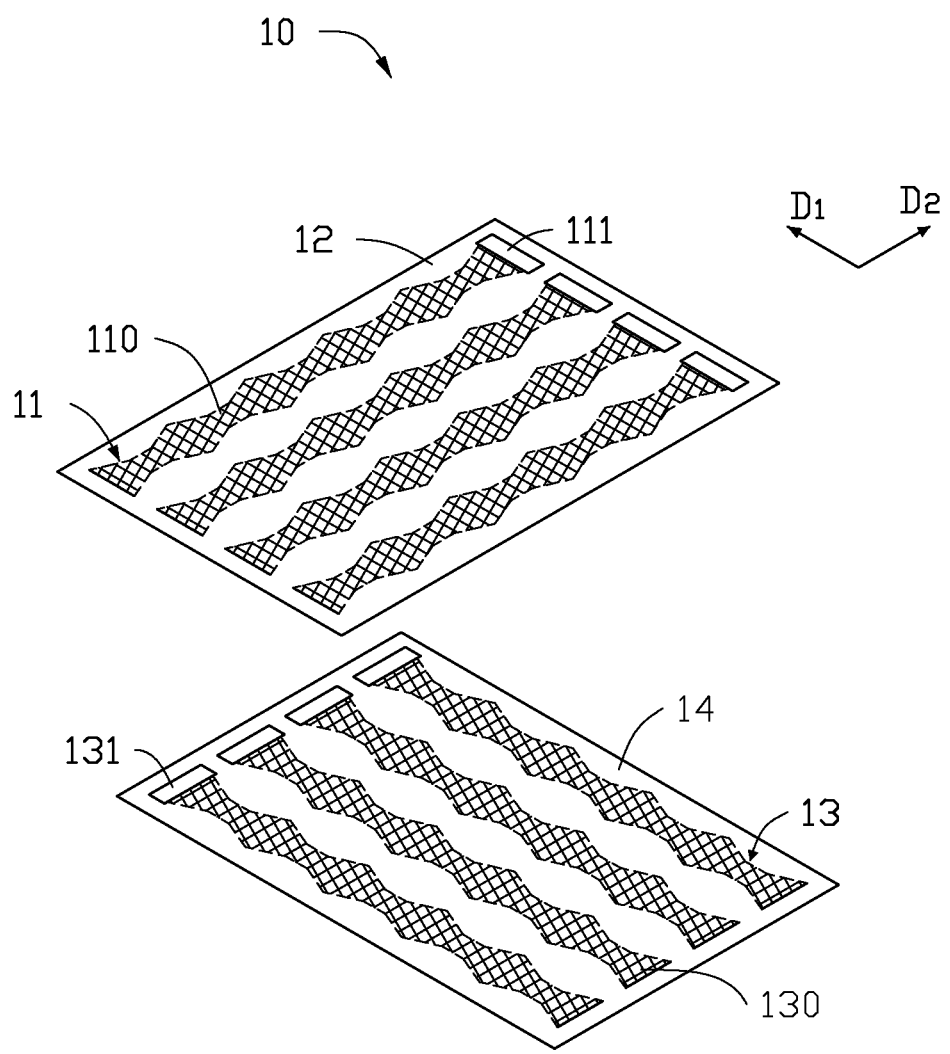
FIG. 2 is an exploded view of the touch panel of FIG. 1.

FIG. 2 illustrates an exploded view of the touch panel 10 of FIG. 1. The first electrode 13 includes a number of first conductive patterns 130 and a number of first interfaces 131 correspondingly connected to the first conductive patterns 130. Each of the first conductive patterns 130 extends in a first direction D1, that is, a longitudinal direction of the first conductive pattern 130. An electrical signal can be conducted along the first direction D1 from the first conductive patterns 130 to the first interfaces 131 or from the first interfaces 131 to the first conductive patterns 130. The first conductive patterns 130 are parallel to each other and arranged in a second direction D2 with a predetermined interval. In this embodiment, the first direction D1 is perpendicular to the second direction D2.

The second electrode 11 includes a number of second conductive patterns 110 and a number of second interfaces 111 correspondingly connected to the second conductive patterns 110. Each of the second conductive patterns 110 extends in the second direction D2, that is, the second conductive pattern 110 extends in a longitudinal direction. An electrical signal can be conducted along the second direction D2 from the second conductive patterns 110 to the second interfaces 111 or from the second interfaces 111 to the second conductive patterns 110. The second conductive patterns 110 are parallel to each other and arranged in the first direction D1 with a predetermined interval.

The first conductive patterns 130 are electrical connected to a touch sensor chip (not shown) via the first interfaces 131. The second conductive patterns 110 are electrical connected to the touch sensor chip via the second interfaces 111. The first conductive patterns 130 cooperate with the second conductive patterns 110 to sense a touch of a user.

Figure 3:
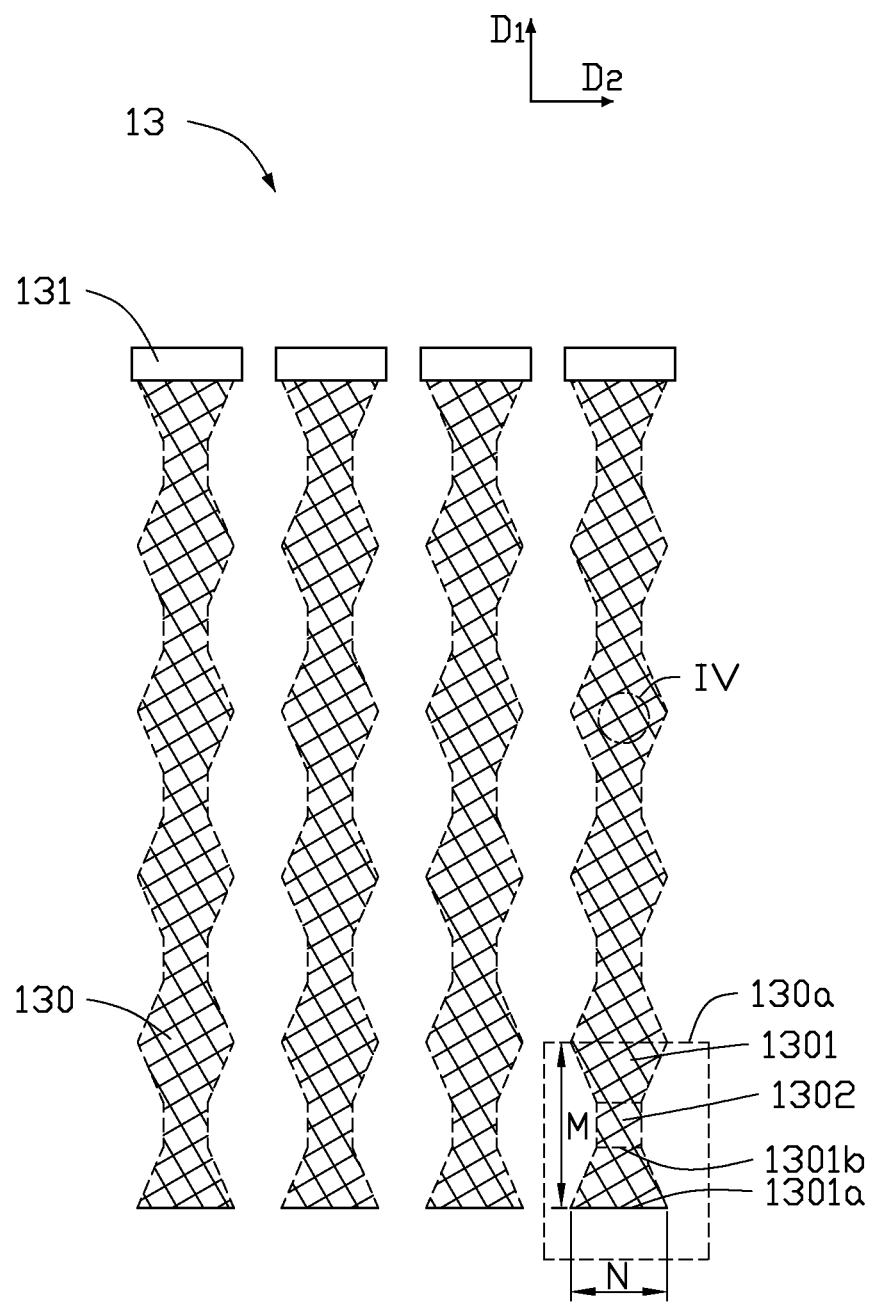
FIG. 3 is an isometric view of a first electrode of the touch panel.

FIG. 3 is an isometric view of the first electrode 13. Each of the first conductive patterns 130 includes a number of first sensing units 130a connected end-to-end. The first conductive patterns 130 are electrical isolated with each other. A border of the first sensing unit 130a is formed by connecting a number of straight lines extending along different directions end-to-end. In this embodiment, the first sensing unit 130a is shaped as a bowknot and includes a pair of end parts 1301 and a middle part 1302. Each of the end parts 1301 is swallow-tail shaped and includes a wide side 1301a and a narrow side 1301b parallel to the wide side 1301a. The end parts 1301 are correspondingly connected to the middle part 1302 via the narrow side 1301b. A length defined between two wide sides 1301a of the pair of the end parts 1301 is illustrated as M. A width of the wide side 1301*a* is illustrated as N. In this embodiment, the middle part 1302 is rectangular. Because the pair of end parts 1301 are correspondingly formed at two opposite longitudinal ends of the middle part 1302, M also represents a length of the first sensing unit 130*a* at an extending direction of the first conductive patterns 130, N also represents a width of the first sensing unit 130*a* at a direction where the first conductive patterns 130 are arranged.

Figure 4:
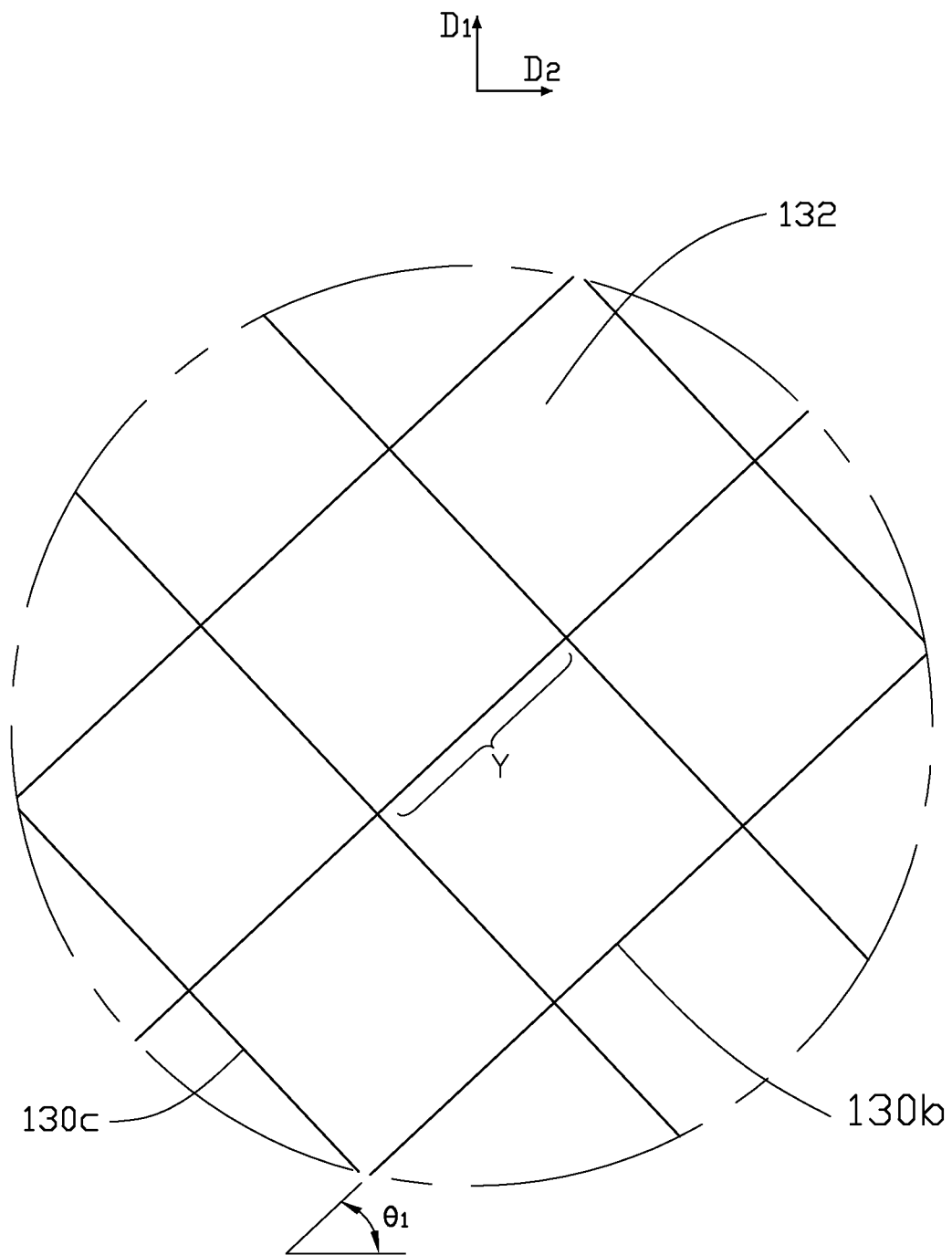
FIG. 4 is an enlarged view of a circled portion IV of FIG. 3.

FIG. 4 is an enlarged view of a circled portion IV of FIG. 3. Each of the first sensing units 130*a* is a mesh electrode and includes a number of first metal wires 130*b* and a number of second metal wires 130*c* crossing with the first metal wires 130*b*. The first metal wires 130*b* are parallel to each other with an interval Y. The second metal wires 130*c* are parallel to each other with the interval Y. In this embodiment, the first metal wires 130*b* are perpendicular to the second metal wires 130*c*. The first metal wires 130*b* cross with the second metal wires 130*c* to form a number of first square meshes 132 with a side length equal to the interval Y. A first angle θ1 is defined between an extending direction of the first metal wires 130*b* and the second direction D2. The first angle θ1 is an acute angle with a degree range from ten degrees to thirty degrees. A mesh pattern of the first electrode 13 satisfies two formulas as below:

$$N \times a = \sqrt{2} \times Y \times (b-1)/\cos(\theta 1) \quad (1)$$

$$M \times c = \sqrt{2} \times Y \times (d-1)/\cos(90-\theta 1) \quad (2)$$

wherein M is the length of the first sensing unit 130*a* at the extending direction of the first conductive patterns 130. N is the width of the first sensing unit 130*a* at a direction where the first conductive patterns 130 are arranged. Letter a is a minum number of the first conductive patterns 130 arranged at the second direction D2. Letter c is a minimum number of the first sensing units 130*a* arranged at the first direction D1. Letter b is a minimum number of first square meshes 132 arranged at the second direction D2. Letter d is a minimum number of first square meshes 132 arranged at the first direction D1.

Figure 5:
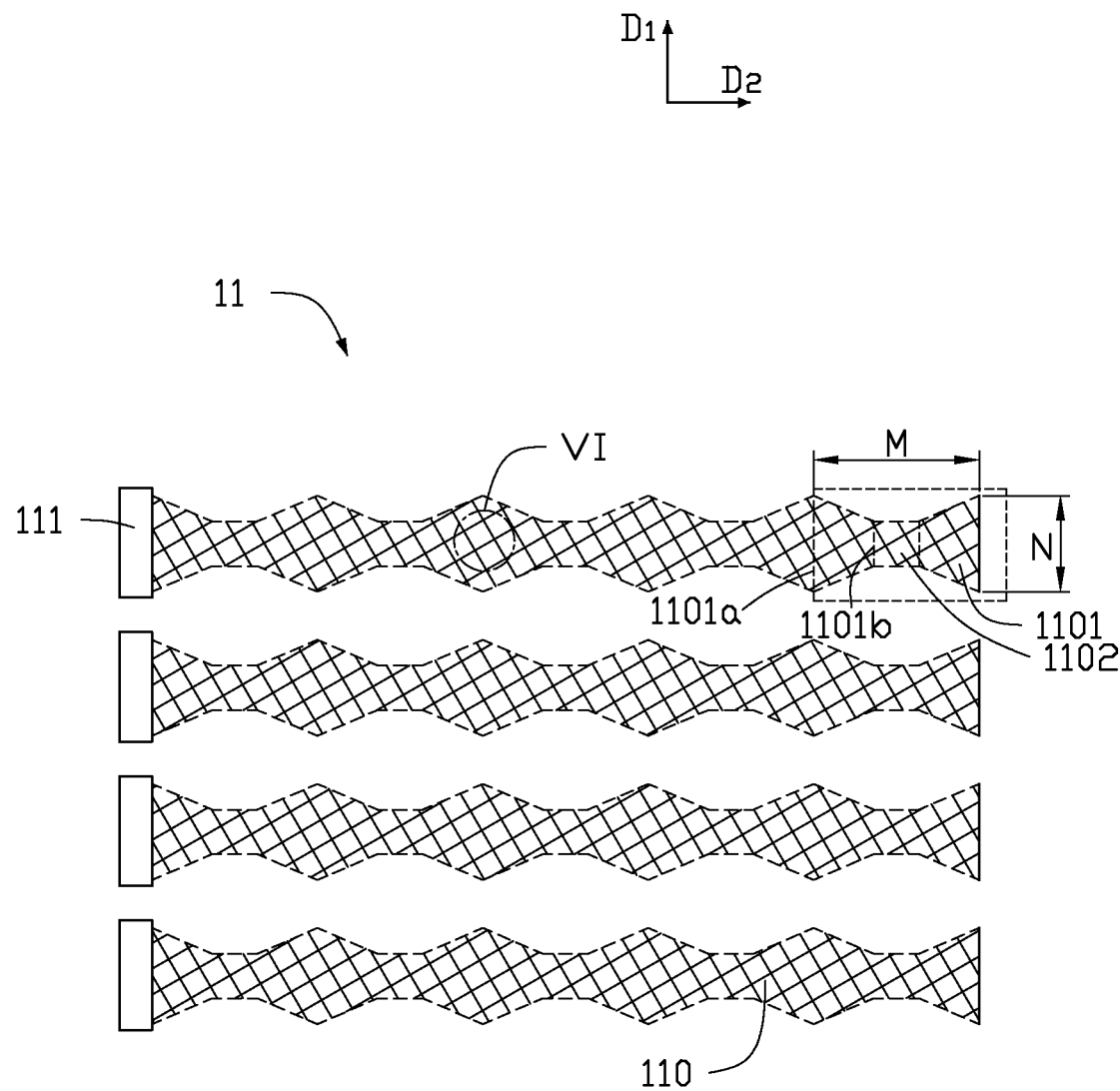
FIG. 5 is an isometric view of a second electrode of the touch panel.

FIG. 5 is an isometric view of the second electrode 11. Each of the second conductive patterns 110 includes a number of first sensing units 110*a* connected end-to-end. The second conductive patterns 110 are electrical isolated with each other. A border of the second sensing unit 110*a* is formed by connecting a number of straight lines extending along different directions end-to-end. In this embodiment, the second sensing unit 110*a* is shaped as a bowknot and includes a pair of end parts 1101 and a middle part 1102. Each of the end parts 1101 includes a wide side 1101*a* and a narrow side 1101*b* parallel to the wide side 1101*a*. The end parts 1101 are correspondingly connected to the middle part 1102 via the narrow side 1101*b*. A length defined between two wide sides 1101*a* of the pair of the end parts 1101 is illustrated as M. A width of the wide side 1101*a* is illustrated as N. In this embodiment, the middle part 1102 is rectangular. Because the pair of end parts 1101 are correspondingly formed at two opposite longitudinal ends of the middle part 1102, M also represents a length of the second sensing unit 110*a* at an extending direction of the first conductive patterns 110, N also represents a width of the first sensing unit 110*a* at a direction where the first conductive patterns 110 are arranged.

Figure 6:
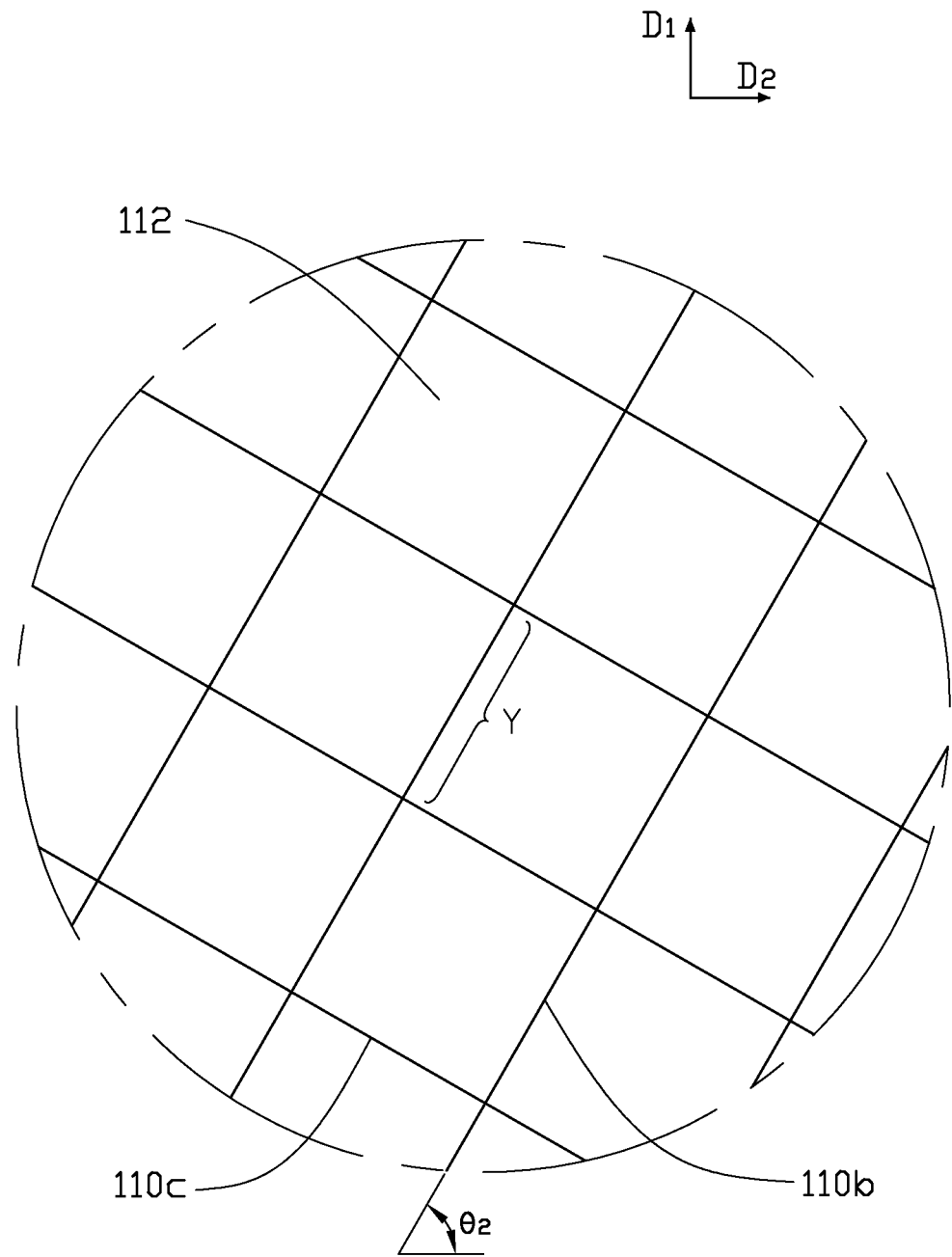
FIG. 6 is an enlarged view of a circled portion VI of FIG. 5.

FIG. 6 is an enlarged view of a circled portion VI of FIG. 5. Each of the second sensing units 110*a* is a mesh electrode and includes a number of third metal wires 110*b* and a number of fourth metal wires 110*c* crossing with the third metal wires 110*b*. The third metal wires 110*b* are parallel to each other with the interval Y. The fourth metal wires 110*c* are parallel to each other with the interval Y. In this embodiment, the third metal wires 110*b* are perpendicular to the fourth metal wires 110*c*. The third metal wires 110*b* cross with the fourth metal wires 110*c* to form a number of second square meshes 112 with a side length equal to the interval Y. A second angle θ2 is defined between an extending direction of the third metal wires 110*b* and the second direction D2. The second angle θ2 is an acute angle with a degree range from ten degrees to thirty degrees. The second angle θ2 is different from the first angle θ1. A mesh pattern of the second electrode 11 satisfies two formulas as below:

$$N \times a = \sqrt{2} \times Y \times (b-1)/\cos(\theta 2) \quad (3)$$

$$M \times c = \sqrt{2} \times Y \times (d-1)/\cos(90-\theta 2) \quad (4)$$

wherein M is the length of the second sensing unit 110*a* at an extending direction of the first conductive patterns 110. N is the width of the first sensing unit 110*a* at a direction where the first conductive patterns 110 are arranged. The letter a is a minimum number of the second conductive patterns 110 arranged at the first direction D1. The letter c is a minimum number of the second sensing units 110*a* arranged at the second direction D2. The letter b is a minimum number of the second square meshes 112 arranged at the first direction D1. The letter d is a mininum number of the first square meshes 112 arranged at the second direction D2.

Figure 7:
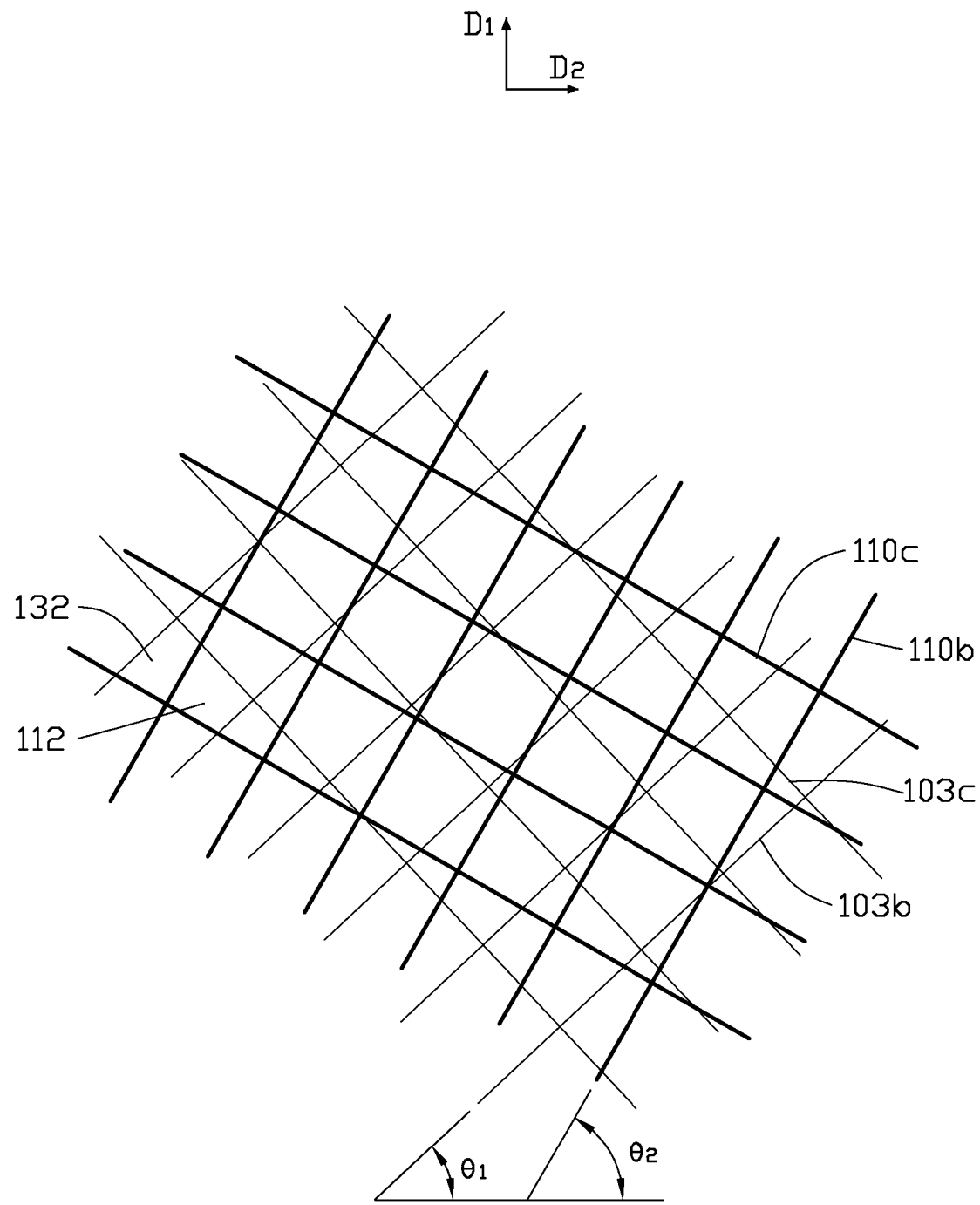
FIG. 7 is an isometric view of the first electrode overlaps the second electrode.

FIG. 7 is an isometric view of the first electrode 13 overlaping the second electrode 11. A number of bold lines illustrate a pattern of the second square meshes 112. A number of fine lines illustrate a pattern of the first square meshes 132. Because the second angle θ2 is different from the first angle θ1, the first metal wires 130*b*, the second metal wires 130*c*, the third metal wires 110*b*, and the fourth metal wires 110*c* are not parallel to each other. Light passing through the first electrode 13 and the second electrode 11 almost does not generate the interference moire.

Figure 8:
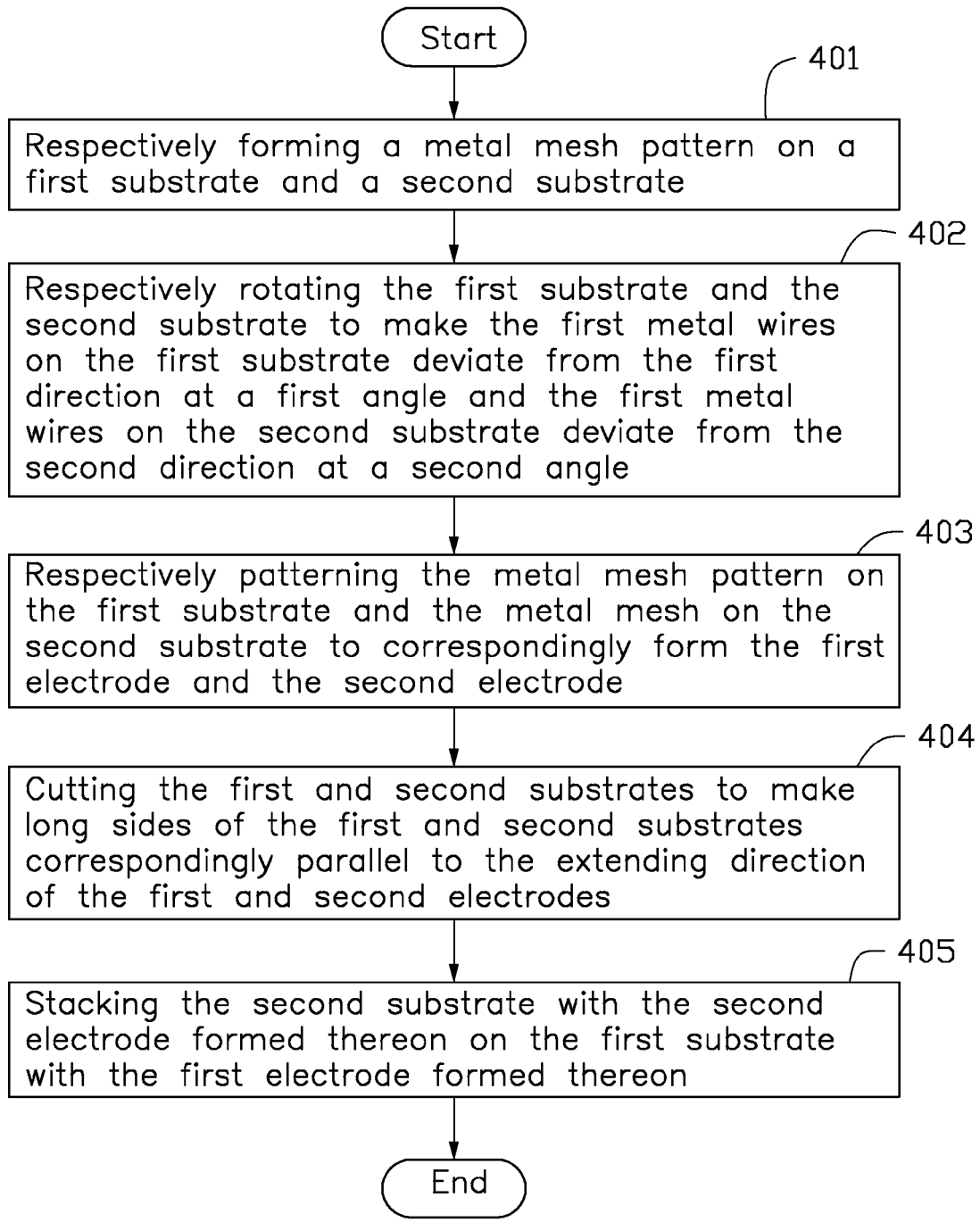
FIG. 8 is a flowchart of an embodiment of a method to manufacture a touch panel.

Referring to FIG. 8, a flowchart is presented in accordance with an exemplary embodiment of a method to manufacture the embodiment of the touch panel 10 is being thus illustrated. The example method is provided by way of example, as there are a variety of ways to carry out the method. The method described below can be carried out using the configurations illustrated in FIGS. 1-7, for example, and various elements of these figures are referenced in explaining example method. Each blocks shown in FIG. 8 represents one or more processes, methods or blocks is by example only and order of the blocks can change according to the present disclosure. The exemplary method can begin at block 401.

Figure 9:
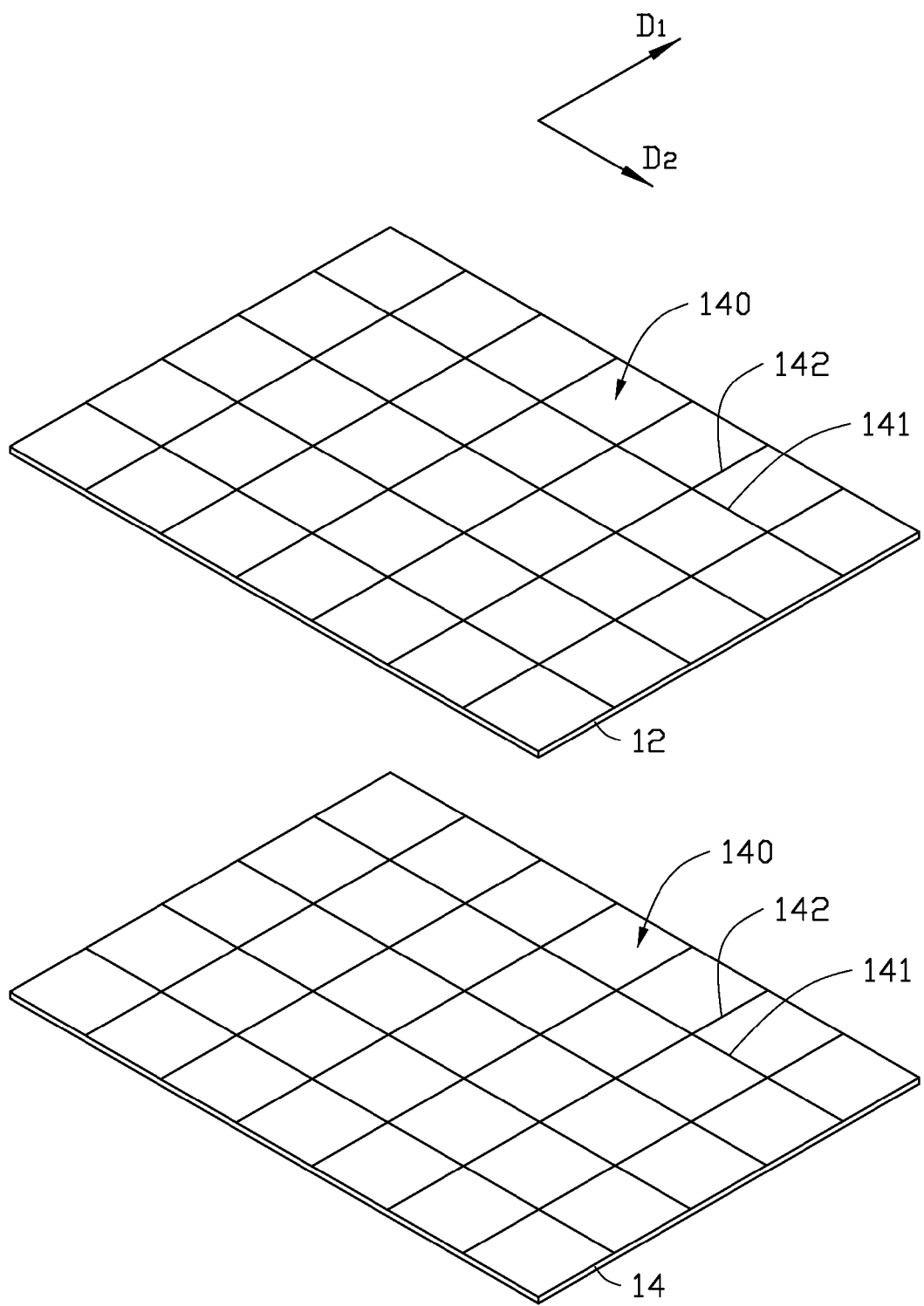
FIG. 9 is an isometric view corresponding to block 401 of FIG. 8.

At block 401, also referring to FIG. 9, a metal mesh pattern 140 is respectively formed on the first substrate 14 and the second substrate 12.

In detail, a photosensitive metal film is respectively formed on the first substrate 14 and the second substrate 12. The photosensitive metal film is made of a material selected from the group consisting of copper (Cu), silver (Ag), gold (Au), tin (Sn), silver halides (AgX) and alloys thereof. The photosensitive metal film is formed by a vacuum evaporation process or an ion plating process. In this embodiment, the photosensitive metal film is made of silver halides. The photosensitive metal film is exposed via a first mask and developed to form the metal mesh pattern 140 including a number of fifth metal wires 141 and a number of sixth metal wires 142 perpendicularly crossing with the fifth metal wires 141. The fifth metal wires 141 are parallel to the second direction D2.

Figure 10:
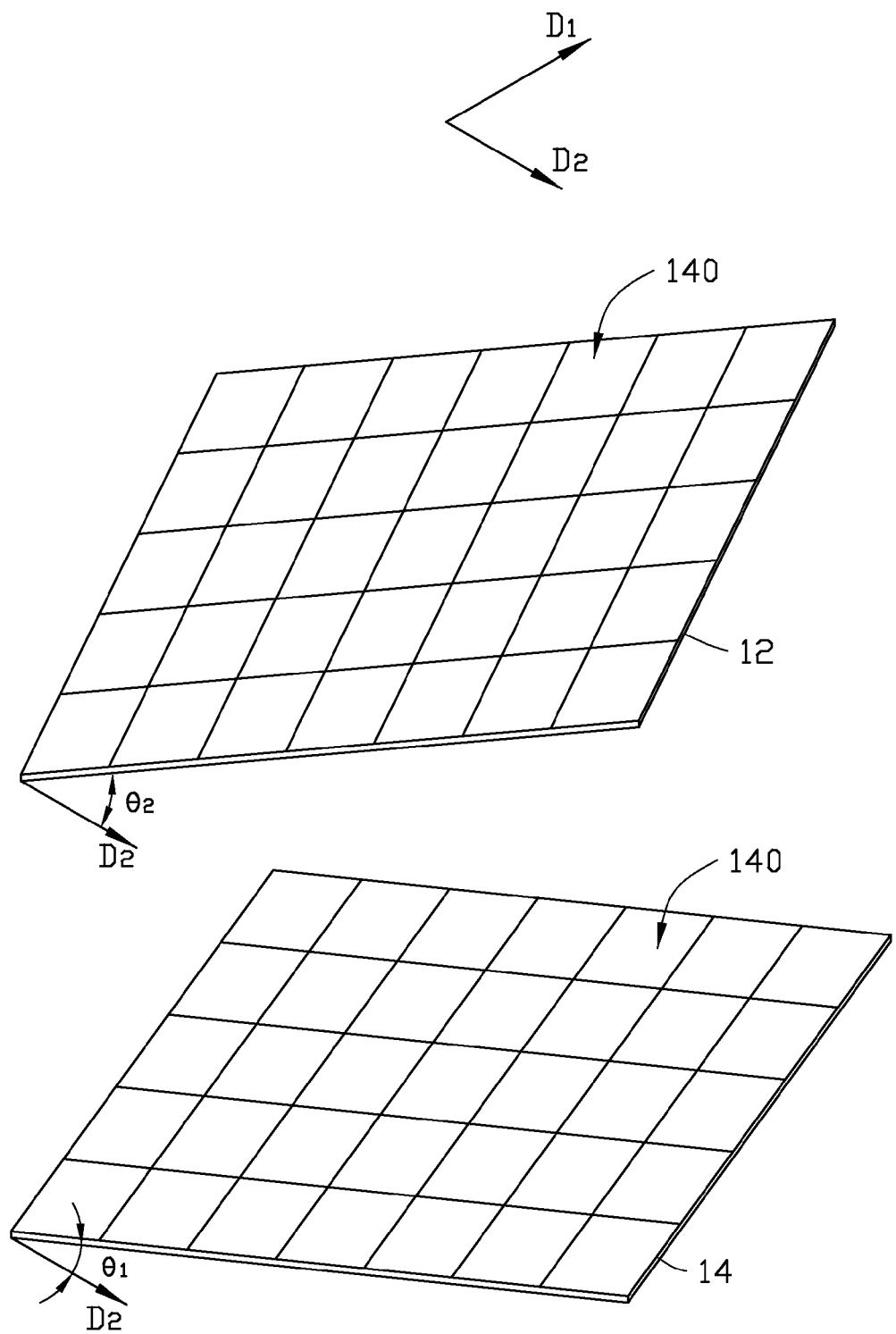
FIG. 10 is an isometric view corresponding to block 402 of FIG. 8.

At block 402, also referring to FIG. 10, the first substrate 14 is rotated to make the fifth metal wires 141 deviate from the second direction D2 at the first angle θ1. The second substrate 12 is rotated to make the fifth metal wires 141 deviate from the second direction D2 at the second angle θ2.

Figure 11:
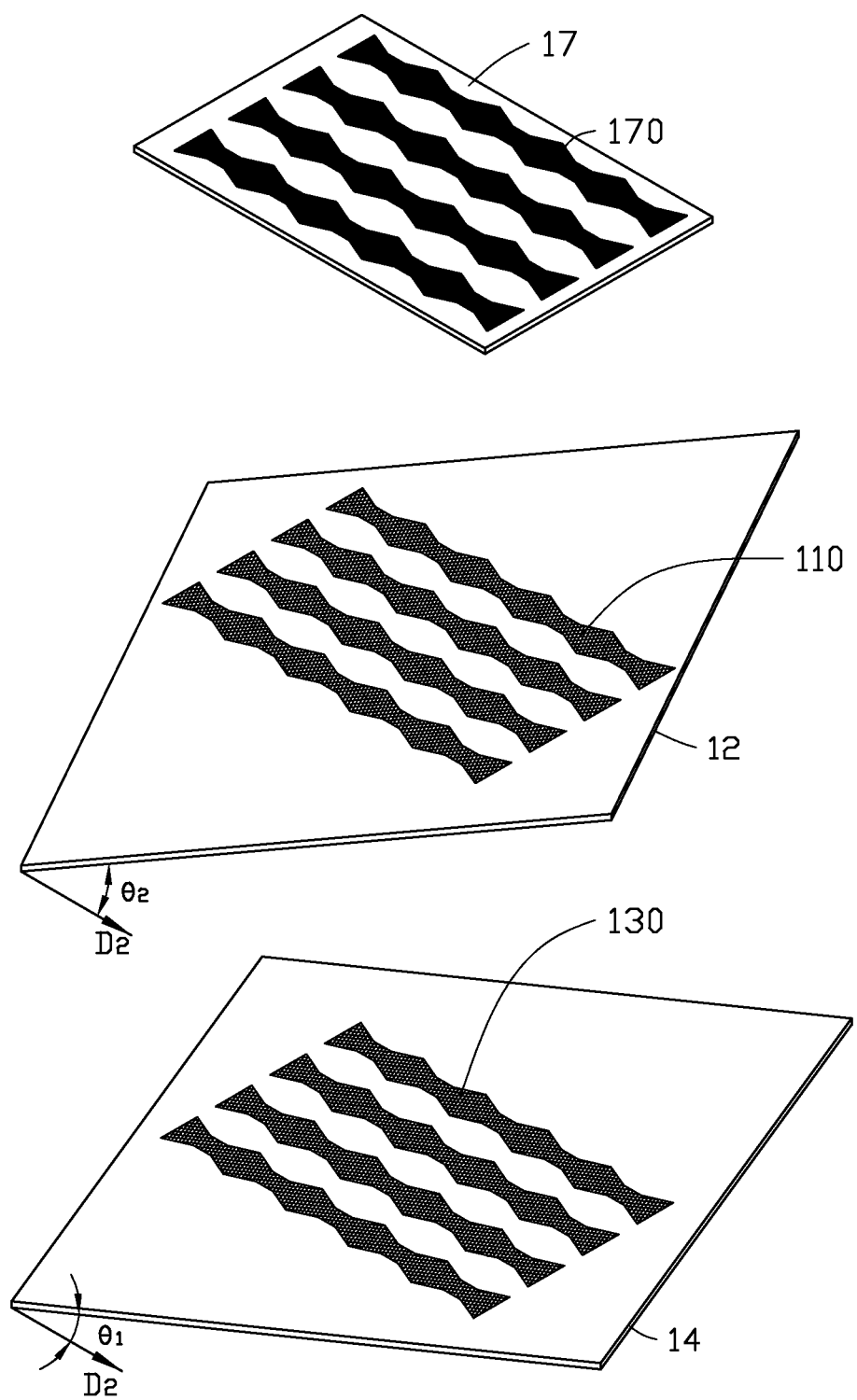
FIG. 11 is an isometric view corresponding to block 403 of FIG. 8.

At block 403, also referring to FIG. 11, the first electrode 13 is formed by patterning the metal mesh pattern 140 on the first substrate 14 via a second mask 17. The second electrode 11 is formed by patterning the metal mesh pattern 140 on the second substrate 12 via the second mask 17.

In detail, the second mask 17 includes a number of opaque parts 170 corresponding to the first conductive patterns 130 or the second conductive patterns 110. A longitudinal direction of the opaque parts 170 is parallel to the second direction D2. A part of the metal mesh pattern 140 not covered by the opaque parts 170 is etched away. The first conductive patterns 130 is formed on the first substrate 14 and the second conductive pattern 110 is formed on the second substrate 12.

Figure 12:
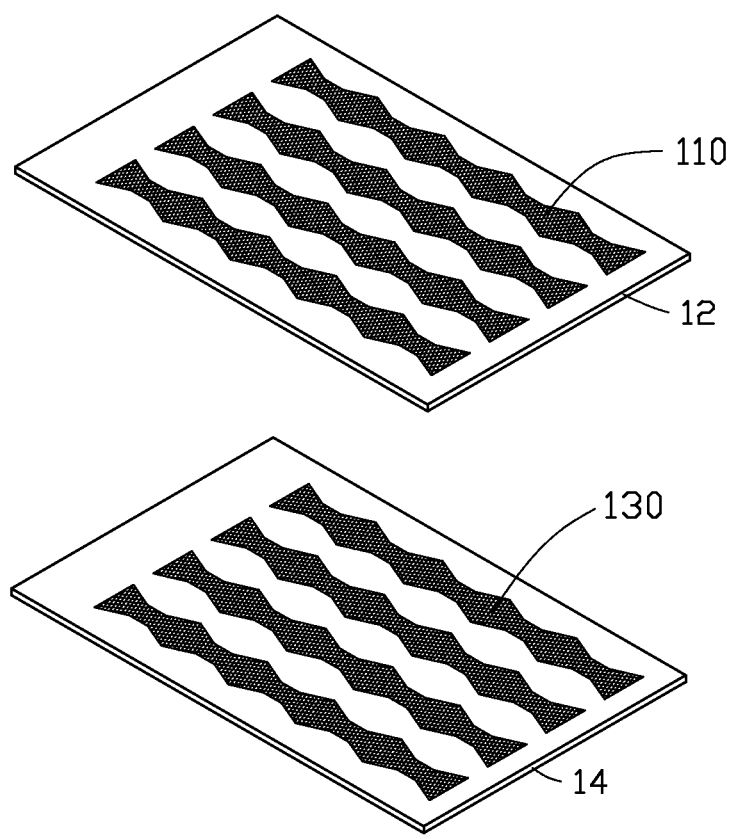
FIG. 12 is an isometric view corresponding to block 404 of FIG. 8.

At block 404, also referring to FIG. 12, the first substrate 14 is cut to make a pair of long sides of the first substrate 14 parallel to the extending direction of the first conductive patterns 130 and a pair of short sides of the first substrate 14 perpendicular to the extending direction of the first conductive patterns 130. The second substrate 12 is cut to make a pair of long sides of the second substrate 12 parallel to the extending direction of the second substrate 12 and a pair of short sides of the second substrate 12.

At block 405, the second substrate 12 with the formed second electrode 11 is stacked on the first substrate 14 to form the touch panel 10. In detail, the second substrate 12 is rotated to make the longitudinal direction of the second conductive pattern 110 parallel to the first direction D1. In this embodiment, the first direction D1 is perpendicular to the second direction D2.

It is believed that the present embodiments and their advantages will be understood from the foregoing description, and it will be apparent that various changes may be made thereto without departing from the scope of the disclosure or sacrificing all of its material advantages.

What is claimed is:

1. A touch panel comprising:
a first substrate;
a first electrode formed on the first substrate and comprising a plurality of first conductive patterns extending in a first direction;
a second substrate; and
a second electrode formed on the second substrate and comprising a plurality of second conductive patterns extending in a second direction,
wherein each of the plurality of first conductive patterns comprises a plurality of parallel first metal wires and a plurality of second metal wires perpendicularly crossing with the plurality of first metal wires, a first angle is defined between the plurality of first metal wires and the second direction, each of the plurality of second conductive patterns comprises a plurality of parallel third metal wires and a plurality of fourth metal wires perpendicularly crossing with the third metal wires, a second angle is defined between the plurality of third metal wires and the second direction, and the first angle is different from the second angle,
wherein each of the plurality of first conductive patterns comprises a plurality of first sensing units connected end-to-end in the first direction, the plurality of first metal wires and the plurality of second metal wires cooperatively form a plurality of first square meshes in the plurality of first sensing unit, each of the second conductive patterns comprises a plurality of second sensing units connected end-to-end in the second direction, and the plurality of third metal wires and the plurality of fourth metal wires cooperatively form a plurality of second square meshes in the plurality of second sensing unit,
wherein each first sensing unit and each second sensing unit are shaped as a bowknot, and each first sensing unit and each second sensing unit respectively comprise a pair of end parts and a middle part, each pair of end parts comprises a wide side and a narrow side parallel to the wide side, and each pair of end parts is connected to two opposite ends of the middle part; and
wherein the middle part is rectangular, a mesh pattern of the first electrode and the second electrode satisfy two formulas as below:

$$N \times a = \sqrt{2} \times Y \times (b-1)/\cos(\theta)$$

$$M \times c = \sqrt{2} \times Y \times (d-1)/\cos(90°-\theta)$$

wherein M is a length of the first sensing unit or the second sensing unit extended in an extending direction thereof, N is a width of the first sensing unit extending in a direction where the first conductive patterns are arranged or a width of the second sensing unit extending in a direction where the second conductive patterns are arranged, letter a is a minimum number of the first conductive patterns arranged in the second direction or a minimum number of the second conductive patterns arranged in the first direction, letter c is a minimum number of the first sensing units arranged in the first direction or a minimum number of the second sensing unit arranged in the second direction, letter b is a minimum number of the first square meshes arranged in the second direction or a minimum number of the second square meshes arranged in the first direction, letter d is a minimum number of the first square meshes arranged in the first direction or a minimum number of the second square meshes arranged the second direction, Y is a side length of the first square meshes or a side length of the second square meshes, and θ is the first angle or the second angle.

2. The touch panel of claim 1, wherein the plurality of first conductive patterns are parallel to each other and arranged in the second direction, and the plurality of second conductive patterns are parallel to each other and arranged in the first direction.

3. The touch panel of claim 1, wherein each of the first angle and the second angle is greater than the ten degrees and less than the thirty degrees.

4. The touch panel of claim 1, wherein the first metal wires, the second metal wires, the third metal wires, and the fourth metal wires are not parallel to each other.

5. The touch panel of claim 1, wherein the first conductive patterns are electrical isolated with each other and the second conductive patterns are electrical isolated with each other.

6. The touch panel of claim 1, wherein the first substrate is a glass substrate and the second substrate is made of polyethylene terephthalate.

7. The touch panel of claim 1, wherein both the first electrode and the second electrode are made of a material selected from the group consisting of copper, silver, gold, tin, silver halides and alloys thereof.

\* \* \* \* \*